United States Patent
Sheng et al.

(10) Patent No.: US 9,521,288 B2
(45) Date of Patent: Dec. 13, 2016

(54) SHEET-FED SCANNER AND IMAGE SCANNING METHOD USING THE SAME

(71) Applicant: AVISION INC., Hsinchu (TW)

(72) Inventors: Thomas Sheng, Hsinchu (TW); Ku-Ming Chen, Hsinchu County (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/716,182

(22) Filed: May 19, 2015

(65) Prior Publication Data

US 2015/0341522 A1 Nov. 26, 2015

(30) Foreign Application Priority Data

May 22, 2014 (TW) .............................. 103117848 A

(51) Int. Cl.
| | | |
|---|---|---|
| H04N 1/04 | (2006.01) | |
| H04N 1/10 | (2006.01) | |
| H04N 1/00 | (2006.01) | |
| H04N 1/028 | (2006.01) | |
| H04N 1/40 | (2006.01) | |

(52) U.S. Cl.
CPC .......... *H04N 1/1008* (2013.01); *H04N 1/0057* (2013.01); *H04N 1/00726* (2013.01); *H04N 1/02815* (2013.01); *H04N 1/40* (2013.01)

(58) Field of Classification Search
CPC H04N 1/1008; H04N 1/0057; H04N 1/00726; H04N 1/02815; H04N 1/40
USPC ........ 358/488, 475, 509, 449, 452, 464, 448
See application file for complete search history.

(56) References Cited

U.S. PATENT DOCUMENTS

| | | | | |
|---|---|---|---|---|
| 7,130,090 B2* | 10/2006 | Reid | ................... | H04N 1/00681 358/475 |
| 7,672,025 B2* | 3/2010 | Luo | ..................... | H04N 1/00681 358/474 |
| 8,159,728 B2* | 4/2012 | Miura | .................... | G06K 9/036 358/475 |

(Continued)

FOREIGN PATENT DOCUMENTS

| | | |
|---|---|---|
| CN | 101783860 B | 7/2010 |
| TW | 292032 | 11/1996 |

(Continued)

OTHER PUBLICATIONS

Taiwan Patent Office, "Office Action" issued on Apr. 25, 2016, Taiwan.

*Primary Examiner* — Cheukfan Lee

(57) ABSTRACT

A sheet-fed scanner comprising a scan channel, a feeding unit, a transmitting unit, a background sheet, a background light source and a scan module is provided. The feeding unit is disposed at an inlet of the scan channel for feeding a document. The transmitting unit transmits the document to pass through the scan channel. The background sheet is disposed on a side of the scan channel, and has a first surface and a second surface. The first surface faces towards the scan channel. The background light source faces towards the second surface to provide an intermittent light signal to the background sheet, so that the background sheet correspondingly displays an intermittent variation background image on the first surface. The scan module is disposed on another side of the scan channel, and captures a document image of a document and the intermittent variation background image to generate scan data accordingly.

15 Claims, 2 Drawing Sheets

(56) References Cited

U.S. PATENT DOCUMENTS

| | | | | |
|---|---|---|---|---|
| 9,071,720 | B2* | 6/2015 | Ikari | H04N 1/02815 |
| 2004/0256583 | A1* | 12/2004 | Hill | H04N 1/00681 |
| | | | | 250/559.01 |
| 2007/0019251 | A1* | 1/2007 | Liao | H04N 1/00681 |
| | | | | 358/474 |
| 2011/0128591 | A1* | 6/2011 | Liao | H04N 1/00795 |
| | | | | 358/474 |
| 2011/0176186 | A1* | 7/2011 | Kanaya | H04N 1/00718 |
| | | | | 358/498 |
| 2012/0069227 | A1* | 3/2012 | Hasuo | H04N 5/3572 |
| | | | | 348/243 |
| 2014/0063567 | A1 | 3/2014 | Ikari et al. | |
| 2015/0002913 | A1* | 1/2015 | Takahashi | H04N 1/00713 |
| | | | | 358/475 |
| 2015/0341513 | A1* | 11/2015 | Chen | H04N 1/00559 |
| | | | | 358/498 |

FOREIGN PATENT DOCUMENTS

| | | |
|---|---|---|
| TW | 201004310 A | 1/2010 |
| TW | M387439 | 8/2010 |
| TW | 201145970 A | 12/2011 |
| TW | 201401843 A | 1/2014 |

\* cited by examiner

SHEET-FED SCANNER AND IMAGE SCANNING METHOD USING THE SAME

This application claims the benefit of Taiwan application Serial No. 103117848, filed May 22, 2014, the subject matter of which is incorporated herein by reference.

BACKGROUND OF THE INVENTION

Field of the Invention

The invention relates in general to a scanner, and more particularly to a sheet-fed scanner and image scanning method using the same.

Description of the Related Art

Existing scanners basically can be classified namely into two types, flatbed scanners and sheet-fed scanners. The flatbed scanner is subjected to many restrictions in terms of use, for example, the cover has to be manually lifted while using, a large volume of documents cannot be scanned automatically in one batch, the size of the flatbed scanner is extremely huge, and the scanning speed is not fast enough. The sheet-fed scanner, such as a name card scanner or a sheet-fed scanner capable of scanning name cards, photos and ordinary documents, advantageously has small volume, light weight and fast scanning speed, and can automatically scan a large volume of documents in one batch. Therefore, for those users requesting automatic document scanning, the sheet-fed scanner is a preferred choice.

However, in subsequent image processing such as automatic cropping and skew correction, the scanning background is required for identifying the boundary between the background image and the scanner document image before proceeding to the next stage of image processing. Since the flatbed scanner has a complete sheet of background sheet, the background sheet can be designed to have a special vein or pattern by which the image processing unit can easily identify the background image and the scan document image without worrying the situation that the background sheet may accidentally have the same color with the scanned document. In comparison, the background sheet of the sheet-fed scanner is strip-shaped, and the scanned region is merely a fixed scan line and cannot have a vein or pattern designed thereon. If the color of the background sheet is too close to that of the scanned document and cannot be used as a basis for identifying the document image and the background image, more delicate image processing cannot be performed. Consequently, the obtained image will have insufficient precision, size error, skewness or cropping mistakes.

SUMMARY OF THE INVENTION

The invention is related to a sheet-fed scanner and an image scanning method using the same capable of identifying the document image and the background image from the scan data for subsequent image processing.

According to one embodiment of the present invention, a sheet-fed scanner comprising a scan channel, a feeding unit, a transmitting unit, a background sheet, a background light source and a scan module is provided. The feeding unit is disposed at an inlet of the scan channel for feeding a document. The transmitting unit is disposed in the scan channel for transmitting the document to pass through the scan channel. The background sheet is disposed on a side of the scan channel, and has a first surface and a second surface. The first surface faces towards the scan channel. The background light source faces towards the second surface to provide an intermittent light signal to the background sheet, which correspondingly displays an intermittent variation background image on the first surface. The scan module is disposed on another side of the scan channel, and captures a document image of the document and the intermittent variation background image to generate scan data when the document passes through the scan channel between the scan module and the background sheet.

According to another embodiment of the present invention, an image scanning method of sheet-fed scanner is provided. The scanner comprises a scan channel, a background sheet, a background light source and a scan module. The background sheet is disposed on a side of the scan channel. The image scanning method comprises following steps. An intermittent light signal is provided to the background sheet by the background light source, and the background sheet correspondingly displays an intermittent variation background image. A document is enabled to pass through the scan channel, so that a document image of the document and the intermittent variation background image are captured by the scan module to generate scan data.

The above and other aspects of the invention will become better understood with regard to the following detailed description of the preferred but non-limiting embodiment(s). The following description is made with reference to the accompanying drawings.

DETAILED DESCRIPTION OF THE INVENTION

In an exemplary example of the present embodiment, a sheet-fed scanner comprising a background sheet and a background light source is provided. The background light source, which can be a light emitting diode (LED), provides an intermittent light signal to the background sheet, which correspondingly displays an intermittent variation background image. After the intermittent variation background image was scanned by the scan module, the scan data which is generated correspondingly will have stripe patterns with light and shade contrast for the use of image identification.

In an embodiment, the stripe patterns with light and shade contrast can be generated by adjusting the luminance of the background light source. For example, when the background light source is adjusted to a first luminance value, the background sheet correspondingly displays a background image with a first luminance value. When the background light source is adjusted to a second luminance, the background sheet correspondingly displays a background image with a second luminance value. The first luminance value and the second luminance value are not the same but both comprise 0 (no luminance). Furthermore, since the luminance value of the background light source has intermittent variation (quick cyclic variation), the corresponding background image displayed by the background sheet also has intermittent variation, and the intermittent variation background image is thus obtained accordingly.

In another embodiment, apart from the two-stage adjustment of the luminance of the background light source, the luminance of the background light source can also be adjusted by way of multi-stage adjustment (such as three-stage adjustment) to obtain other types of intermittent variation background images. For example, the luminance of the background light source can be adjusted by way of two-stage or three-stage adjustment, so that the intermittent variation image is displayed by one of an alternating black and white image, an alternating black, gray and white image, an alternating black and gray image, and an alternating gray and white image. Black, gray and white colors correspond to three most representative luminance values when the luminance is adjusted to the brightest luminance from the darkest luminance. The luminance values are not restricted to any specific values, but any values will do as long as these values can be used for subsequent image identification.

A number of embodiments are disclosed below for elaborating the invention. However, the embodiments of the invention are exemplary and explanatory only, not for limiting the scope of protection of the invention.

Figure 1:
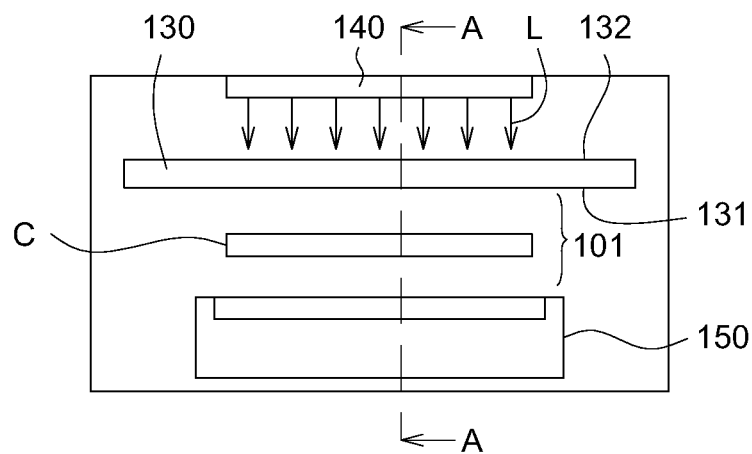
FIG. 1 shows a schematic diagram of a sheet-fed scanner along a vertical direction according to an embodiment of the invention.
Figure 2:
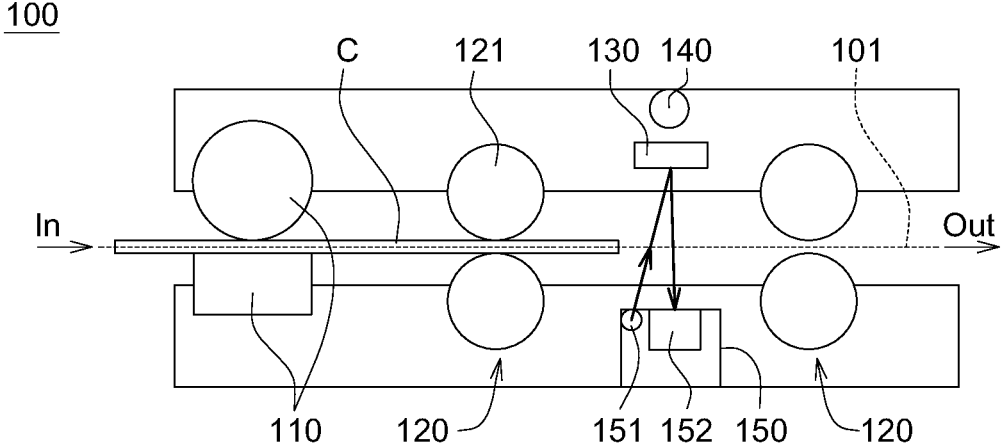
FIG. 2 shows a schematic diagram of a sheet-fed scanner along a horizontal direction according to an embodiment of the invention.

Referring to FIGS. 1 and 2. FIG. 1 shows a schematic diagram of a sheet-fed scanner 100 along a vertical direction according to an embodiment of the invention. FIG. 2 shows a schematic diagram of a sheet-fed scanner 100 along a horizontal direction according to an embodiment of the invention. As indicated in FIG. 1, the sheet-fed scanner 100 comprises a scan channel 101, a background sheet 130, a background light source 140 and a scan module 150, but a feeding unit 110 and a transmitting unit 120 are not shown in FIG. 1. The document C passes through the scan channel 101 along a normal direction of the plane of FIG. 1. The feeding unit 110 and the transmitting unit 120 are shown in FIG. 2 being a cross-sectional view along a cross-sectional line A-A of FIG. 1. As indicated in FIG. 2, the feeding unit 110 is disposed at an inlet In of the scan channel 101 for feeding the document C into the scanner 100. The transmitting unit 120 is disposed in the scan channel 101 for transmitting the document C to pass through the scan channel 101 and to be scanned by the scan module 150. The transmitting unit 120 may comprise a plurality of roller sets 121 which are respectively disposed at the inlet In of the scan channel 101, the outlet Out, or the front or the rear of the scan module 150. The roller sets 121 clamp the top surface and the bottom surface of the document C and provide a suitable driving force for moving the document C forward along the scan channel 101.

As indicated in FIG. 1, the background sheet 130 is disposed on a side of the scan channel 101, and the scan module 150 is disposed on another side of the scan channel 101, so that the background sheet 130 and the scan module 150 are opposite to each other. The background sheet 130 has a first surface 131 and a second surface 132. The first surface 131 faces towards the scan channel 101, and the second surface 132 faces towards the background light source 140. In an embodiment, the first surface 131 and the second surface 132 can be two opposite surfaces of the background sheet 130. The intermittent light signal L provided by the background light source 140 enters the background sheet 130 via the second surface 132, such that the background sheet 130, after receiving a light, correspondingly displays an intermittent variation background image on the first surface 131. In another embodiment, the first surface 131 and the second surface 132 are not restricted to two opposite surfaces of the background sheet 130, and can be realized by any surfaces as long as the intermittent light signal L provided by the background light source 140 can enter the background sheet 130 via the second surface 132, such that the background sheet 130, after receiving a light, correspondingly displays an intermittent variation background image on the first surface 131.

To put it in greater details, when the background light source 140 does not provide a light source, the scan light source 151 penetrates the background sheet 130 in a bottom up manner, the image sensing unit 152 is unable to receive an image signal corresponding to the background sheet 130, and the region of the background sheet 130 not shielded by the document C displays a black color. When the background light source 140 provides a weak light source, the weak light source penetrates the background sheet 130 in a top down manner and is further received by the image sensing unit 152, and the image signal corresponding to the background sheet 130 displays a gray color. When the background light source 140 provides a strong light source, the image signal corresponding to the background sheet 130 displays a white color. Therefore, by dynamically adjusting the intensity of the background light source, the image signal corresponding to the background sheet 130 will display different colors.

In an embodiment, the background sheet 130, which can be formed of a light guiding material, a light absorbent material or a trans-reflective filtering material, becomes translucent when receiving a light. If the material of the background sheet 130 is incapable of guiding or absorbing the light or may easily reflect the light, such material, after receiving a light, is still non-translucent and is unsuitable for the background sheet 130 of the invention. Preferably, the background sheet 130 of the present embodiment can be realized by a translucent sheet treated with surface atomization, a trans-reflective sheet or a translucent sheet containing emulsified composition, such that the background sheet 130, after receiving a light, will generate a specific lighting effect. Take the translucent sheet containing emulsified composition for example, the background sheet 130 will display a milky color after receiving a light.

Refer to FIG. 2. After the document C entered the scan channel 101, the scan light source 151 is activated to scan the document C. When the document C passes the scan channel between the scan module 150 and the background sheet 130, the scan module 150 is fixed, and the scan light source 151 emits a light to the document C or the first surface 131 of the background sheet 130. Then, the light is reflected to the image sensing unit 152, which receives the reflected light and captures a scan line. The document C is enabled to pass through the scan module 150 by the transmitting unit 120, such that the image sensing unit 152 gradually captures a plurality of scan lines of the document C to form scan data. In the present embodiment, the scan module 150 not only captures a document image of the document C but also captures the intermittent variation background image displayed on the background sheet 130 to generate a scan data. In other words, after the intermittent variation background image was scanned by the scan module 150, the scan data correspondingly generated has stripe patterns with light and shade contrast for the identification of the document image.

Figure 3:
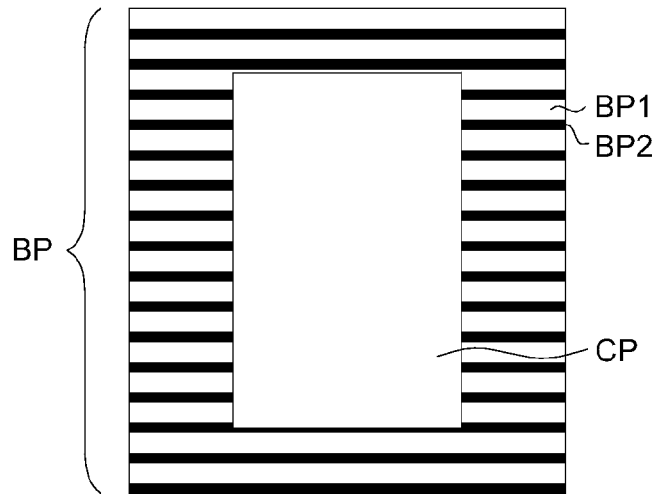
FIG. 3 shows an image file of a scan data.

Referring to FIG. 3, an image file of scan data DA is shown. In an embodiment, the scan data DA comprises a document image CP captured by the scan module 150 and a series of intermittent variation background images BP generated within a scan time to form a predetermined image file. The intermittent variation background images BP are such as first stripe pattern BP1 (represented by a white background) and second stripe pattern BP2 (represented by a black background) both having cyclic variations. As indicated in FIG. 3, the region not shielded by the document image CP displays the first stripe pattern BP1 and the second stripe pattern BP2 both formed by solid segments, and the region shielded by the document image CP displays the first stripe pattern BP1 and the second stripe pattern BP2 formed by broken segments. Thus, the boundary, shape or size of the document image CP can be obtained from the analysis of the distribution region of stripe pattern and the background data performed by the processor (or software). In FIG. 3, the background image having intermittent variation is exemplified with stripe patterns having a certain width. In reality, each scan line is close to a 1D image signal, because the first stripe pattern BP1 or the second stripe pattern BP2 can be formed of a plurality of scan lines or one single scan line. Although the present embodiment and FIG. 3 are exemplified with stripe patterns having regular intermittent variation, the invention is not limited thereto. In practical application, the stripe patterns can be realized by a non-alternating patterns having unequal widths or irregular patterns having a combination such as black/black/white/ black/white, a combination such as black/gray/black/white/ black/black, and etc.

Figure 4:
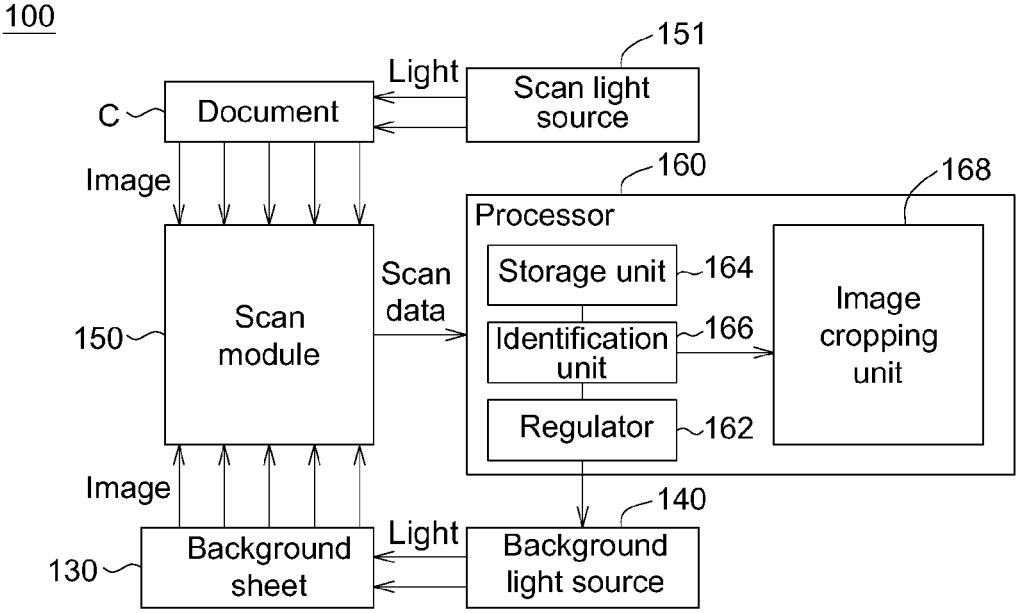
FIG. 4 shows a block diagram of a sheet-fed scanner according to an embodiment of the invention.

Referring to FIG. 4, a block diagram of a sheet-fed scanner 100 according to an embodiment of the invention is shown. As indicated in FIG. 4, after the document C reflected the light emitted by the scan light source 151, the scan module 150 (containing the image sensing unit 152) captures a document image of a document C. Meanwhile, the background sheet 130 receives an intermittent light signal provided by the background light source 140, so that the scan module 150 captures the intermittent variation background image corresponding to the background sheet 130 to generate scan data. Besides, the sheet-fed scanner 100 may comprise a processor 160 located inside the scanner 100 or inside a control unit of a computer. The processor 160 is connected to the scan module 150 to receive the scan data for identifying the document image.

In an embodiment, the processor 160 comprises a regulator 162, a storage unit 164 and an identification unit 166. The regulator 162 is connected to the background light source 140 for controlling a variation cycle of the intermittent light signal L. The storage unit 164 stores background data corresponding to the variation cycle. The identification unit 166 identifies the document image CP from the scan data DA according to the background data stored in the storage unit 164. The regulator 162, the storage unit 164 and the identification unit 166 can be realized by components of an integrated circuit, such as logic switch, memory and chipset. In addition, the regulator 162, the storage unit 164 and the identification unit 166 can also be independent components.

In short, the identification unit 166 can obtain the region and position of the scan data shielded by the document image CP according to the background data and the scan data to identify the boundary, shape or size of the document image CP. In the present embodiment, the identification unit 166 may further determine whether the document image CP is skewed; if yes, a skew correction can be performed accordingly.

In an embodiment, the processor 160 may further comprise an image cropping unit 168 connected to the identification unit 166 for cropping the document image CP in the scan data.

Of the generally known technologies, the background sheet is single colored (such as white), and the scan module only captures images at a fixed position, therefore specific patterns cannot be generated, and the sheet-fed scanner cannot significantly distinguish the document image from the background image when the color of the background sheet is too close to that of the scanner document. It can be known from the above embodiments that the background sheet 130 of the invention can receive the intermittent light signal L and correspondingly display the intermittent variation background image, such as the background sheet having specific patterns, because the identification unit 166 may easily identify the boundary of the document image CP and the size of the document image CP according to the background data and the scan data. In subsequent image processing, the processor 160 can further accurately identify the boundary of the document image CP and avoid errors in size cropping and boundary determination.

The image scanning method of the sheet-fed scanner 100 is disclosed in above embodiments with detailed descriptions and drawings. The method comprises following steps. Firstly, an intermittent light signal L is provided to the background sheet 130 by the background light source 140, so that the background sheet 130 correspondingly displays an intermittent variation background image. Then, a document C is enabled to pass through the scan channel 101, and a document image CP of the document C and a series of intermittent variation background images BP are captured by the scan module 150 to generate scan data DA. Then, the scan data DA is received and the document image CP is identified from the scan data DA by the processor 160. For example, the identification unit 166 identifies the boundary of the document image CP and determines the size of the document image CP according to the background data stored in the storage unit 164. Then, the document image CP of the scan data DA is cropped.

According to the sheet-fed scanner and the image scanning method using the same disclosed in above embodiments of the invention, the document image and the background image can be identified from the scan data for subsequent accurate image processing and the problems unresolved in generally known technologies can be resolved accordingly.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sheet-fed scanner, comprising:
  a scan channel;
  a feeding unit disposed at an inlet of the scan channel for feeding a document;
  a transmitting unit disposed in the scan channel for transmitting the document to pass through the scan channel;
  a background sheet disposed on a side of the scan channel and having a first surface facing towards the scan channel and a second surface;
  a background light source facing towards the second surface to provide an intermittent light signal to the background sheet, which correspondingly displays an intermittent variation background image on the first surface; and a scan module disposed on another side of the scan channel, wherein when the document passes through the scan channel between the scan module and the background sheet, the scan module captures a document image of the document and the intermittent variation background image to generate scan data.

2. The sheet-fed scanner according to claim 1, further comprising a processor which connects to the scan module to receive the scan data, wherein the processor comprises:
 a regulator connected to the background light source for controlling a variation cycle of the intermittent light signal;
 a storage unit for storing a background data corresponding to the variation cycle; and
 an identification unit for identifying the document image from the scan data according to the background data stored in the storage unit.

3. The sheet-fed scanner according to claim 2, wherein the identification unit further identifies a boundary of the document image and determines a size of the document image.

4. The sheet-fed scanner according to claim 2, wherein the processor further comprises an image cropping unit which crops the document image of the scan data.

5. The sheet-fed scanner according to claim 1, wherein the intermittent variation image is displayed by one of an alternating black and white image, an alternating black, gray and white image, an alternating black and gray image and an alternating gray and white image.

6. The sheet-fed scanner according to claim 1, wherein the background sheet is a translucent sheet treated with surface atomization.

7. The sheet-fed scanner according to claim 1, wherein the background sheet is a trans-reflective sheet.

8. The sheet-fed scanner according to claim 1, wherein the background sheet is a translucent sheet containing emulsified composition.

9. The sheet-fed scanner according to claim 1, wherein the background light source is a light emitting diode (LED).

10. An image scanning method of a sheet-fed scanner, wherein the scanner comprises a scan channel, a background sheet, a background light source and a scan module, the background sheet is disposed on a side of the scan channel, the image scanning method comprising:
 providing an intermittent light signal to the background sheet by the background light source, and the background sheet correspondingly displaying an intermittent variation background image; and
 having a document passed through the scan channel, so that a document image of the document and the intermittent variation background image are captured by the scan module to generate scan data.

11. The method according to claim 10, wherein:
the scanner further comprises a processor, which receives the scan data and identifies the document image from the scan data.

12. The method according to claim 11, wherein the processor further comprises a regulator, a storage unit and an identification unit, and the method further comprises:
 controlling a variation cycle of the intermittent light signal by the regulator;
 storing a background data corresponding to the variation cycle to the storage unit; and
 identifying the document image from the scan data by the identification unit according to the background data stored in the storage unit.

13. The method according to claim 12, wherein the step of identifying the document image further comprises identifying a boundary of the document image and determining a size of the document image.

14. The method according to claim 13, further comprising:
 cropping the document image of the scan data.

15. The method according to claim 10, wherein the intermittent variation background image is displayed by one of an alternating black and white image, an alternating black, gray and white image, an alternating black and gray image and an alternating gray and white image.

* * * * *